Nov. 21, 1961
H. T. BUDENBOM
3,010,081
HYBRID RING ARRANGEMENT
Filed July 18, 1952
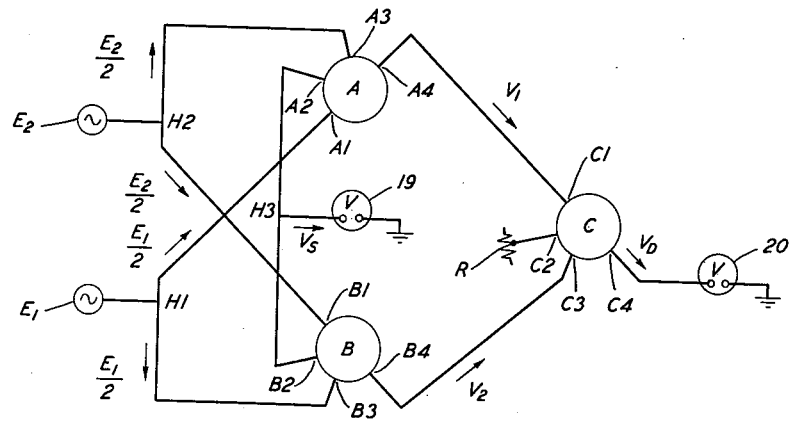
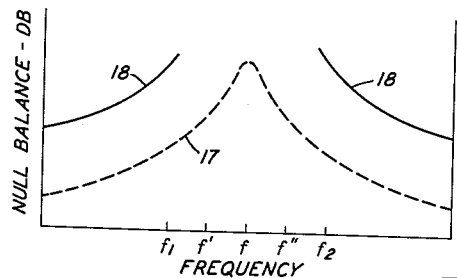
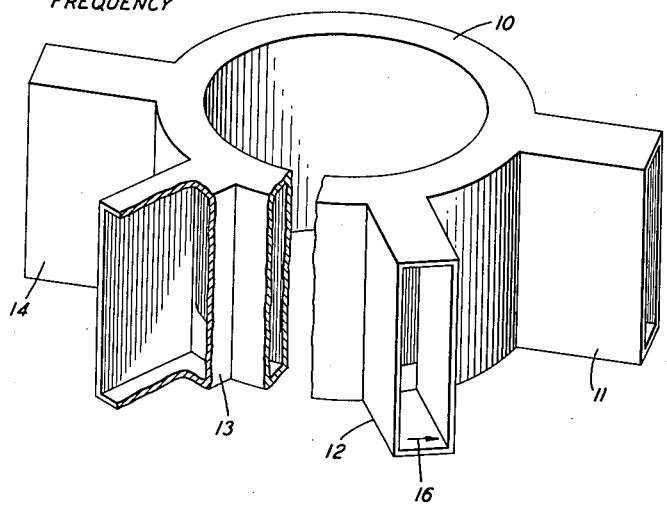
INVENTOR
H. T. BUDENBOM
BY
*Ralph P. Holcomb*
ATTORNEY US United States Patent Office 3,010,081
Patented Nov. 21, 1961

3,010,081
HYBRID RING ARRANGEMENT
Horace T. Budenbom, Short Hills, N.J., assignor to Bell Telephone Laboratories, Incorporated, New York, N.Y., a corporation of New York
Filed July 18, 1952, Ser. No. 299,613
16 Claims. (Cl. 333—9)

This invention relates to wave transmission networks and more particularly to a biconjugate network comprising a parallel arrangement of hybrid rings.

The principal object of the invention is to obtain the complex sum of and difference between two coherent voltages.

Another object is to increase the frequency range over which a high null balance may be obtained in a biconjugate network.

A further object is to increase the power handling capability of such a network.

It is known that a four-arm hybrid ring may be designed to have biconjugate properties which may be utilized in obtaining the complex sum of and difference between two coherent voltages. Structures of this type are disclosed, for example, in United States Patent No. 2,445,895, to W. A. Tyrrell, issued July 27, 1948, in a paper by W. A. Tyrrell entitled "Hybrid Circuits for Microwaves," published in the November 1947 issue of the Proceedings of the I.R.E., in my copending patent application Serial No. 52,856, filed October 5, 1948, now Patent No. 2,784,381 issued March 5, 1957 and in my paper entitled "Analysis and Performance of Waveguide-Hybrid Rings for Microwaves" in the July 1948 Bell System Technical Journal. One such hybrid ring comprises a section of wave guide coaxial cable, or other type of transmission line formed into a closed loop or ring having an effective length of 3/2 wavelengths $\lambda$ at a selected design frequency $f$ and four transmission branches connected in series with the ring at successive points thereon spaced apart by a distance equal to $\lambda/4$ at the frequency $f$. If the four branches are of proper impedance and are properly terminated, two non-adjacent branching points on the ring will be conjugate, and the remaining pair of branching points will also be conjugate. When the two coherent voltages are impressed upon one pair of conjugate points, a voltage proportional to their complex sum may be obtained at the intermediate point and a voltage proportional to their complex difference at the fourth point. Such a sum-and-difference device performs quite satisfactorily at the frequency $f$, but as this frequency is changed the performance is progressively degraded. This is due to the fact that the electrical length of the ring and the electrical spacing between the branching points change with frequency, causing a reduction of the null balance. Also, the power handling capability of a single ring is inadequate for some applications.

In the sum-and-difference network in accordance with the present invention, the performance is greatly improved by employing two similar four-arm hybrid rings, which may be of the type described above, connected in parallel, with the connections to one ring having a mirror-image relationship with respect to the connections to the other. More specifically, if the four branching points in each of two rings A and B are consecutively designated one to four with the first and fourth points diametrically opposite each other, one of the coherent voltages is impressed in equal amplitude upon the first point in the ring A and the third point in the ring B, and the other voltage is impressed in equal amplitude upon the first point in the ring B and the third point in the ring A. The output voltages at the second points in the rings are combined to obtain a voltage proportional to the complex sum of the two input voltages. The output voltages at the fourth points are combined to obtain a voltage proportional to the complex difference between the input voltages. In this arrangement, the frequency range over which the balance is high has been greatly increased because an unbalance voltage developed in one ring, when the frequency $f$ is changed, is cancelled by an equal unbalance voltage of opposite polarity developed in the other ring. Furthermore, because two rings are used in parallel, the power handling capability of the network is substantially double that of a network comprising only a single ring or a number of tandem-connected rings.

The nature of the invention and its various objects, features, and advantages will appear more fully in the following detailed description of a typical embodiment illustrated in the accompanying drawing, of which FIG. 1 is a perspective view, partly cut away, of a four-arm hybrid ring known in the prior art;

FIG. 2 is a schematic circuit of a sum-and-difference network in accordance with the invention employing two four-arm hybrid rings connected in parallel; and FIG. 3 shows typical null balance characteristics obtainable with a single ring and with the arrangement of FIG. 2.

The four-arm hybrid ring shown in FIG. 1 is of the type disclosed, for example, in FIG. 12 of the above-cited Tyrrell patent and also in FIGS. 1 and 1A of my above-mentioned patent. It comprises a section of uniform transmission line 10 formed into a closed loop or ring and four transmission lines 11, 12, 13, and 14 branching therefrom at spaced points. As shown, each of the lines is a hollow-pipe wave guide of oblong cross section, but it is to be understood that they may have some other form of cross section and that a coaxial cable or other type of transmission line may be used. Such a wave guide is adapted to transmit dominant electromagnetic waves having an electric field parallel to the narrower sides, as indicated by the arrow 16 in the branch 12. The ring 10 has a mean circumference equal in effective length to $3\lambda/2$, where $\lambda$ is the wavelength within the wave guide at the selected design frequency $f$. The branches 11, 12, 13, and 14 have equal spacings, on the mean circumference of the ring 10, of $\lambda/4$, making the spacing between the branches 11 and 14, in either direction around the ring 10, equal to $3\lambda/4$. All of the branches are connected to the ring in the electric plane; that is, the shorter transverse dimension of the ring 10 is parallel to the plane of the ring, and the narrower sides of the branches are parallel with the plane of the ring. This corresponds to series electrical connections for the branches. If the characteristic impedances of the branches are properly chosen with respect to the characteristic impedance of the line 10 and the branches are terminated in their characteristic impedances, the points at which two non-adjacent branches, such as 11 and 13, are connected to the ring will be conjugate, the points at which the other two branches 12 and 14 are connected will also be conjugate, and there will be a good impedance match at each of these points.

A four-arm biconjugate ring of the type just described may be used as a sum-and-difference network. If two coherent voltages of frequency $f$ are impressed upon the two non-adjacent branches 12 and 14, for example, a voltage proportional to their complex sum will appear at the intermediate branch 13 and a voltage proportional to their complex difference at the remaining branch 11. The performance of the network depends upon the degree of conjugacy or null balance obtainable. For best performance, the output voltage on the branch 11 should be zero for equal voltage inputs on the branch 12 and 14. The broken-line curve 17 of FIG. 3 shows how this null balance, expressed in decibels, varies with frequency.

The balance is quite good at the design frequency $f$ but falls off rather rapidly at higher or lower frequencies.

This decreases in balance as the frequency deviates from $f$, caused by a species of frequency selectivity inherent in the hybrid ring, may be explained by considering a single input voltage applied to the branch 13 of a ring B similar to the ring 10, with the branches 12 and 14 iteratively terminated. The general conjugacy characteristics of the ring 10 are such that, for the purpose of analysis, this is the same as considering two coherent voltages applied to the branches 12 and 14. At the frequency $f$, the distance from the input branch 13 around the ring 10 in a clockwise direction to the branch 11 is a wavelength, and the distance between them in a counter-clockwise direction is a half wavelength, giving a difference between the two paths of a half wavelength. Therefore, wave energy travelling from the branch 13 to the branch 11 along one path will be $\pi$ radians out of phase with that traversing the other path, and no voltage will appear on the branch 11, resulting in a high null balance. Now, if the frequency is lowered to $f'$, the clockwise distance in wavelengths from the branch 13 to the branch 11 will be increased twice as much as the counter-clockwise distance. These two paths will no longer differ by $\pi$ radians, and the voltage $V_1$ on the branch 11 will not be zero but will have a certain magnitude and phase, and the null balance will be lowered.

Now consider a second identical four-arm hybrid ring A but with the input voltage in this case applied to the branch 12, and the branches 11 and 13 terminated. At the frequency $f'$, the counter-clockwise distance in wavelengths from the input branch 12 to the branch 14 will be increased twice as much as the clockwise distance. The null balance-frequency characteristic of the ring A will, therefore, be similar to that of the ring B.

If the rings A and B are now arranged in parallel as shown in FIG. 2, described more fully hereinafter, it will be found that at the frequency $f'$ the voltage $V_1$ on the branch A4 will have the same magnitude as the voltage $V_2$ on the branch B4 but will be out of phase therewith by $\pi$ radians. The vectorial sum of the voltages $V_1$ and $V_2$ will thus be substantially zero, resulting in a high null balance as shown by the typical solid-line characteristic 18 in FIG. 3. Likewise, if the frequency of the input voltage to the two rings is increased to $f''$, the null balance obtainable will still be high. It will be noted in FIG. 3 that the curve 18 is considerably above the curve 17 throughout the range shown, and between the frequencies $f_1$ and $f_2$ the balance obtainable with the two rings, differentially connected, exceeds the maximum obtainable with a single ring even at the design frequency $f$.

The principle just explained is employed in the sum-and-difference network in accordance with the invention shown schematically in FIG. 2, in which voltages of frequency $f$ from two coherent sources $E_1$ and $E_2$ are impressed upon two similar hybrid rings A and B, with the connections thereto having a mirror image relationship. The voltages $E_1$ and $E_2$ may, for example, be the two collector voltages picked up by the two horns of an amplitude monopulse system. Each of the rings A and B may, for example, be of the type shown in FIG. 1, having a mean circumference of $3\lambda/2$ at the design frequency $f$ and four transmission branches with a spacing of $\lambda/4$. In the ring A the branches are designated A1, A2, A3 and A4, clockwise, and in the ring B they are designated B1, B2, B3, and B4, counter-clockwise, with A4 opposite A1 and B4 opposite B1.

The voltage $E_1$ is divided at the hybrid structure H1 into two equal voltages, $E_1/2$, as indicated by the arrows. Likewise, the voltage $E_2$ divides at a second hybrid structure H2 into equal voltages $E_2/2$. As appropriate dividers are well known in the art, they need not be described here in the detail. The voltages $E_1/2$ are impressed, respectively, upon the branch A1 of the ring A and the branch B3 of the ring B. The voltages $E_2/2$ are applied, respectively, to the branch B1 of the ring B and the branch A3 of the ring A. The output voltages from the branches A2 and B2 are added vectorially in a third hybrid structure H3 to give a voltage $V_S$ which is proportional to the complex sum of the input voltages $E_1$ and $E_2$. The voltage $V_S$ may be displaced on a voltmeter or other indicating device 19.

The output voltages $V_1$ from the branch A4 and $V_2$ from the branch B4 are likewise added vectorially in a hybrid structure C. The hybrid C may, for example, be similar to the hybrid rings A and B, with a mean circumference of $3\lambda/2$ and four branches C1, C2, C3, and C4 spaced $\lambda/4$ apart. In this case, however, the branch C2 is terminated in its characteristic impedance R, as indicated schematically. The output voltages $V_1$ and $V_2$ from the branches A4 and B4 are applied to the conjugate branches C1 and C3, respectively, to produce at the branch C4 a voltage $V_D$ proportional to the complex difference between the input voltages $E_1$ and $E_2$. The voltage $V_D$ is read on a second voltmeter or other indicating device 20. In accordance with the principle explained above, if the voltages $E_1$ and $E_2$ are equal, the unbalance voltages $V_1$ and $V_2$ will also be equal but out of phase by $\pi$ radians, and therefore the output difference voltage $V_D$ will be substantially zero. As shown by the curve 18 of FIG. 3, a high null balance is obtainable over a considerable frequency range. It is apparent that, with respect to null balance, the sum-and-difference network of FIG. 2 employing two rings is greatly superior to a single-ring device. Furthermore, since the rings A and B operate in parallel, the circuit in accordance with the invention has approximately twice the power handling capability of a single-ring network or one made up of several rings connected in tandem.

It is to be understood that the above-described arrangement is illustrative of the application of the principles of the invention. Numerous other arrangements may be devised by those skilled in the art without departing from the spirit and scope of the invention.

What is claimed is:

1. A network for obtaining the complex sum of and difference between two coherent voltages comprising two closed transmission loops each having an effective length of 3/2 wavelengths at a selected design frequency and four transmission branches connected in series therewith at successive points thereon spaced apart by a quarter wavelength at said frequency, said branches for reference being consecutively designated one to four with the first and fourth branches equally spaced from each other in either direction around the loop, means for applying one of said voltages in equal amplitude to the first branch of one of said loops and the third branch of the other of said loops, means for impressing the other of said voltages in equal amplitude upon the third branch of said one loop and the first branch of said other loop, means for combining the output voltages on the second branches of said loops to obtain a voltage proportional to said sum, and means for combining the output voltages on the fourth branches of said loops to obtain a voltage proportional to said difference.

2. A network in accordance with claim 1 in which said last-mentioned means comprise a third transmission loop similar to said first two loops, the second branch of said third loop being terminated in its characteristic impedance, and the output voltages on the fourth branches of said first two loops being applied, respectively, to the first and third branches of said third loop.

3. A network in accordance with claim 1 in which said transmission loops are constituted by sections of wave guide.

4. A network in accordance with claim 3 in which said wave guide is of the hollow-pipe type.

5. A network in accordance with claim 3 in which said wave guide is oblong in cross section and in each of said loops the smaller transverse dimension of the guide is parallel with the plane of the loop.

6. In combination, two sources of coherent voltages, two closed transmission loops each having a length of 3/2 wavelengths at a selected frequency and four transmission branches connected in series therewith at successive points thereon spaced apart by a quarter wavelength at said frequency, said branches for reference being consecutively designated one to four with the first and fourth branches diametrically opposite each other, means for connecting the first branch of one of said loops and the third branch of the other of said loops to one of said sources, means for connecting the third branch of said one loop and the first branch of said other loop to the other of said sources, and means for adding vectorially the output voltages from the second branches of said loops.

7. The combination in accordance with claim 6 in which each of said loops is constituted by a section of wave guide.

8. The combination in accordance with claim 7 in which said wave guide is of the hollow-pipe type.

9. The combination in accordance with claim 8 in which said wave guide is oblong in cross section and the smaller transverse dimension thereof is parallel with the plane of the loop.

10. The combination in accordance with claim 6 and means for adding vectorially the output voltage from the fourth branches of said loops.

11. The combination in accordance with claim 6 in which said connecting means include a dividing network.

12. In combination, two sources of coherent voltages, two closed transmission loops each having a length of 3/2 wavelengths at a selected frequency and four transmission branches connected in series therewith at successive points thereon spaced apart by a quarter wavelength at said frequency, said branches for reference being consecutively designated one to four with the first and fourth branches diametrically opposite each other, means for connecting the first branch of one of said loops and the third branch of the other of said loops to one of said sources, means for connecting the third branch of said one loop and the first branch of said other loop to the other of said sources, and means for adding vectorially the output voltages from the fourth branches of said loops.

13. The combination in accordance with claim 12 in which each of said loops is constituted by a section of wave guide.

14. The combination in accordance with claim 13 in which said wave guide is of the hollow-pipe type.

15. The combination in accordance with claim 14 in which said wave guide is oblong in cross section and the smaller transverse dimension thereof is parallel with the plane of the loop.

16. The combination in accordance with claim 12 in which said connecting means include a dividing network.

References Cited in the file of this patent

UNITED STATES PATENTS

| | | |
|---|---|---|
| 2,445,895 | Tyrrell | July 27, 1948 |
| 2,561,212 | Lewis | July 17, 1951 |

FOREIGN PATENTS

| | | |
|---|---|---|
| 673,957 | Great Britain | June 18, 1952 |